United States Patent
Shakya et al.

(10) Patent No.: US 9,817,537 B1
(45) Date of Patent: Nov. 14, 2017

(54) CAPACITIVE TOUCH SENSING SYSTEM USING SWITCHED CAPACITOR ANALOG SIGNAL PROCESSING

(71) Applicant: UICO, INC., Elmhurst, IL (US)

(72) Inventors: Jyotindra Shakya, Fremont, CA (US); Kenneth C. Crandall, Sunnyvale, CA (US); Hiten Singh Randhawa, Saratoga, CA (US)

(73) Assignee: UICO, Inc., Elmhurst, IL (US)

( * ) Notice: Subject to any disclaimer, the term of this patent is extended or adjusted under 35 U.S.C. 154(b) by 0 days.

(21) Appl. No.: 15/291,531

(22) Filed: Oct. 12, 2016

(51) Int. Cl.
*G06F 3/045* (2006.01)
*G06F 3/044* (2006.01)
*G06F 3/041* (2006.01)

(52) U.S. Cl.
CPC ............ *G06F 3/044* (2013.01); *G06F 3/0418* (2013.01)

(58) Field of Classification Search
CPC ........................................... G06F 3/041–3/047
See application file for complete search history.

(56) References Cited

U.S. PATENT DOCUMENTS

| 8,866,793 B2 | 10/2014 | Wadia |  |
|---|---|---|---|
| 2011/0273400 A1* | 11/2011 | Kwon | G06F 3/0416 345/174 |
| 2014/0035862 A1* | 2/2014 | Jeong | G01R 27/26 345/174 |
| 2014/0176482 A1 | 6/2014 | Wei et al. |  |
| 2014/0204053 A1* | 7/2014 | Crandall | G06F 3/0418 345/174 |

* cited by examiner

*Primary Examiner* — Hang Lin
(74) *Attorney, Agent, or Firm* — Brinks Gilson & Lione

(57) ABSTRACT

A capacitive touch sensing system for a capacitive touch panel uses analog circuitry to perform capacitive sensing and signal processing. The system operates over several time phases to charge and discharge a capacitive sensor of the touch panel and determine its capacitance. The system actively reconfigures and reuses circuit components over the several phases to minimize circuit size, complexity and power usage. The result is greatly reduced chip area by performing major signal processing functions in a small piece of analog circuitry. This reduces cost by combining the signal processing functions into a small, time-sequenced switched-capacitor analog circuit.

18 Claims, 12 Drawing Sheets

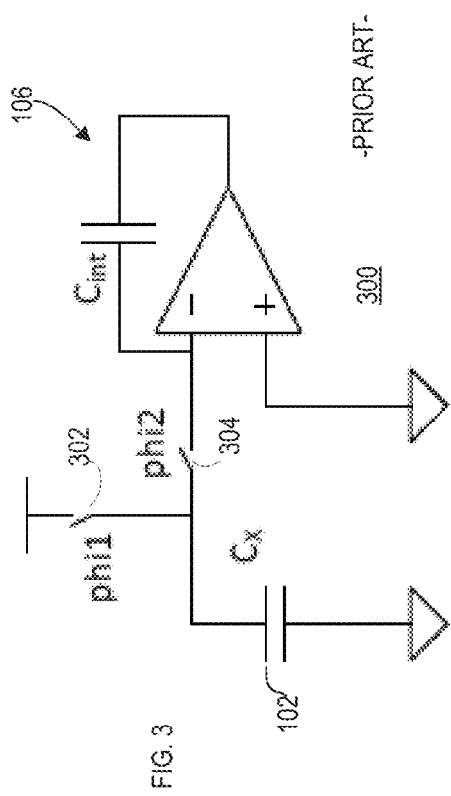
FIG. 3 -PRIOR ART-
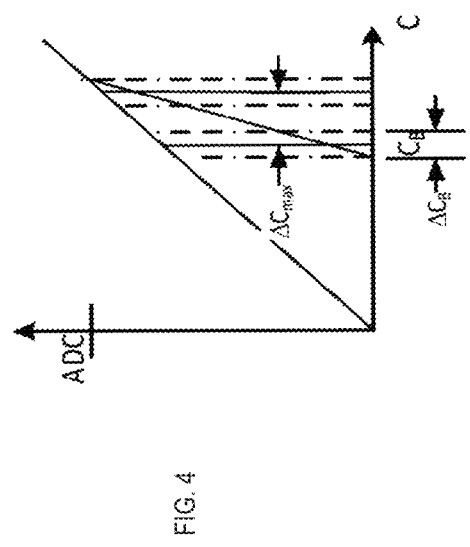
FIG. 4

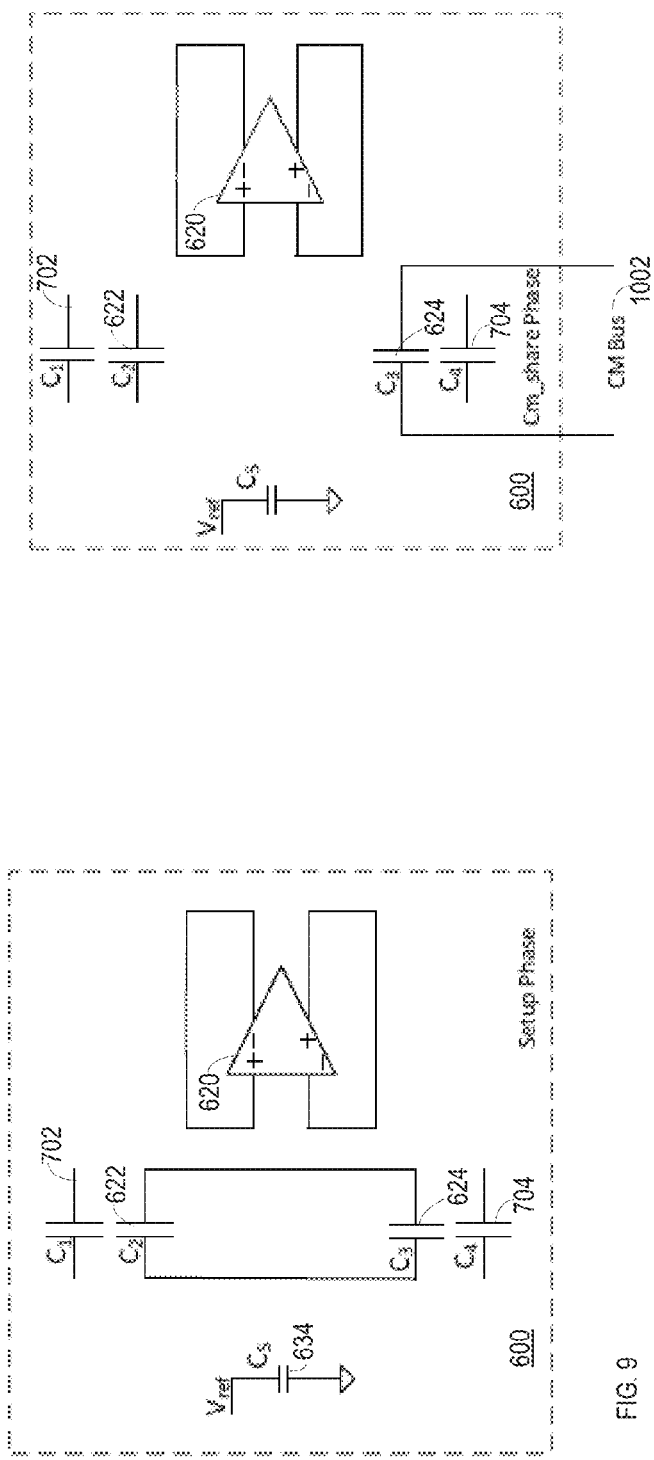
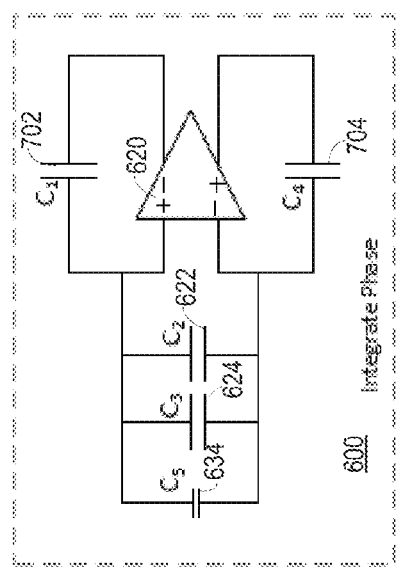
FIG. 10
FIG. 9
FIG. 11

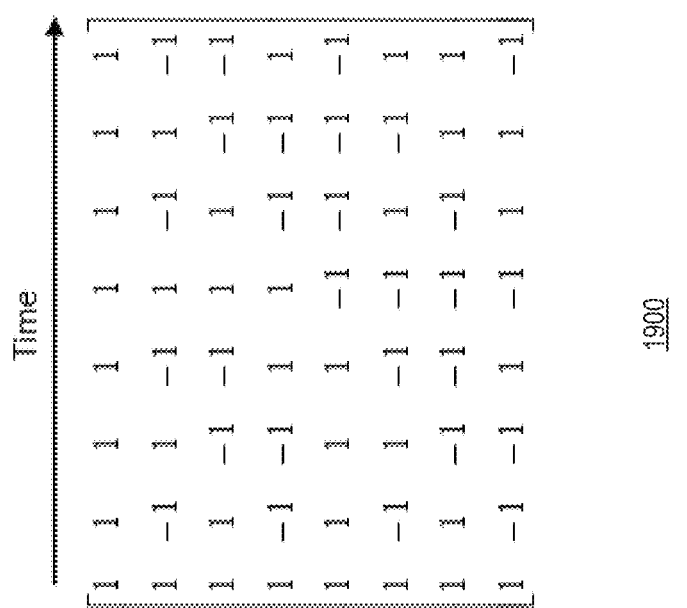

CAPACITIVE TOUCH SENSING SYSTEM USING SWITCHED CAPACITOR ANALOG SIGNAL PROCESSING

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The present disclosure relates generally to a capacitive touch sensing system. More particularly, the present disclosure relates to a capacitive touch sensing system using switched capacitor signal processing.

Capacitive touch sensors are often used in combination with a display such as a liquid crystal display (LCD) to provide a user interface for an electronic device such as a smart phone, tablet computer or other portable device. The LCD may be used to provide text and graphics information to a user. The capacitive touch sensor may be used to sense the user's touch interaction with the device, including sensing motions such as taps, swipes and rotations of a finger, stylus or other object across the surface of the touch sensor. In other applications, the touch sensor is used alone, without an LCD or other display to receive user input.

Design requirements for capacitive touch sensors include low cost and immunity to noise and other electrical interference. The capacitive touch sensor tends to operate in an environment with substantial electrical interference. In a device such as a smartphone, the adjacent LCD or other display is driven by signals that may be noisy. Other circuits of the device may be sources of interference as well. Immunity to such interference is an important design goal. Since smart phones and other devices incorporating a capacitive touch sensor are typically commodity products with relatively low profit margins, minimizing component cost and assembly cost is also important.

As devices are miniaturized and become more highly integrated, in some cases it is desirable to integrate capacitive touch sensor circuitry with display driver circuitry that generates the signals necessary to drive the LCD or other display. The sensor and driver circuitry may even be integrated in the same integrated circuit or integrated adjacently. As a consequence, the touch sensors will be close to the display pixels and will pick up more noise from the display. In a highly integrated embodiment, the touch sensors and display are integrated in a single assembly. In this case, the touch sensors will be on the LCD substrate, away from the cover glass of the sensor display assembly and thus more distant from the finger, stylus or other source of signal. Thus, the signal to noise ratio will be relatively small when noise is greater than in conventional embodiments. In such systems, it is imperative to increase the gain and hence sensitivity to be able to detect small changes in sensor capacitance. However due to large background capacitance it is not possible to do so without clipping in conventional touch sensing systems.

Conventional capacitive touch sensors make use of analog to digital technology to sense a touch or other interaction with the touch sensor. The analog to digital input circuits are typically followed by extensive digital signal processing technology. These circuits operate to perform the necessary capacitive sensing and noise filtering and other processes. However, these circuits typically require large, expensive blocks of circuitry on one or more integrated circuits. The cost of components is generally proportional to the integrated circuit area required for implementation. The cost of analog to digital components, plus digital signal processing components, can greatly add to the component cost and assembly cost of a finished product. Secondly, if the signal processing is done in digital domain, any signal below least significant bit of the analog to digital converter is lost and cannot be recovered. Increasing resolution of analog to digital converters used comes at the cost of silicon area.

Accordingly, there is a need for a capacitive touch sensor providing reduced cost, higher sensitivity and improved immunity to noise and other electrical interference.

BRIEF SUMMARY

A system and method providing improved scanning of frames of touch sensor data from a capacitive touch sensor is proposed. A frame represents a scan of the entire capacitive touch sensor panel, providing data indicative of touches to the capacitive touch sensor panel, if any. The capacitive touch sensor panel typically includes an array or matric of capacitive sensors Cx. Each capacitive touch sensor has an associated channel circuit with a limited number of reusable components. The components of the channel circuit are reused by selectively reconfiguring those components to provide necessary functionality during each phase of operation of the channel circuit. Exemplary embodiments employ a plurality of n capacitive sensors that are connected to groups of switches, capacitors, operational amplifiers, comparators, and digital counters for sensing change in capacitance of the respective n capacitive sensors. Selectable switching devices and configuration data provided by a control circuit are used to reconfigure and reuse these circuit components to vary, in discrete time phases, the circuit topology that interconnects these devices. This serves to improve efficiency of usage of the components and reduce overall circuit size and complexity. Each phase is responsible for a different signal processing action. In various embodiments, the phases include the following, which may be best understood in conjunction with the associated drawing figures.

Phase 0, Reset

This phase executes once at the beginning of each scan frame. It discharges all associated capacitors and resets all associated digital counters. All integrators are reset to an initial value.

Phase 1, Charge Unknown Sensor Capacitance Cx

This phase charges each sensor capacitor Cx. The current going into the sensor capacitance Cx is monitored and is integrated in a continuous time integrator using integration capacitors C2 and C3.

Phase 2, Discharge Cx

This phase discharges each sensor capacitor Cx. The discharge current from Cx is monitored and is integrated in the same continuous time integrator. The current is inverted, such that it is additive to the integral in Phase 1. Hence twice the total charge going into the sensor capacitance Cx is stored onto the integrating capacitors C2 and C3.

Phase 3, Bias Removal and Phase 4,5 Set-Up

The integrating capacitors C2 and C3 in the differential integrator are disconnected from the operational amplifier and then connected in parallel after reversing C3. This action results in removing any difference in C2 and C3 voltage due to input common mode. The resulting signal on C2 and C3 is proportional to Cx and is used in the processing in phase 4 and 5.

Phase 4, Sharing to Find Average Signal

In Phase 4, half of the signal charge on all C3 capacitors is connected in parallel to share charge. The resulting voltage and hence charge on all C3 capacitors is the average charge across all n sensors. C5 is also charged to Vref to prepare for phase 5.

Phase 5, Primary Integration

In this phase, the average charge on C3 is subtracted from the signal charge on each C2, such for each sensing channel, only the deviation from mean is used as signal. During this phase the integrator is configured as switch-capacitor integrator and does switch capacitor signal processing. In the same phase a fixed amount of charge on C5 is either subtracted or added based on previous comparison in a signal processing step often called sigma delta analog to digital conversion. This in turn over $2^N$ cycles, where N is the number of bits of the sigma delta converter, converts remaining analog charge into digital signal, which will be proportional to the sensor capacitance minus average capacitance.

Phase 6, Comparator

In this Phase, the output of the switched capacitor integrator is compared in a differential comparator. If the comparator output is positive, a counter is incremented by one count and a value d=1, else the counter is decremented by one count and the value d=−1. The value of d is used to control the integration sign of C5 charge in phase 5 to provide negative feedback of the sigma delta loop. The comparator output is sigma delta modulated and after summing the number of positive and negative outputs from the comparator over $2^N$ cycles the sigma delta loop converts analog signal charge into equivalent digital value.

BRIEF DESCRIPTION OF THE DRAWINGS

FIG. 3 is an example of a conventional capacitance sensing circuit;
FIG. 4 is an example plot of analog to digital conversion (ADC) level versus capacitance;
FIGS. 7-11 are a series of exemplary circuit diagrams illustrating configuration of the AFE circuit of FIG. 6 during operation of the AFE circuit in various respective operating modes.
FIG. 19 shows an exemplary Hadamard matrix.

DETAILED DESCRIPTION OF THE PRESENTLY PREFERRED EMBODIMENTS

Figure 1:
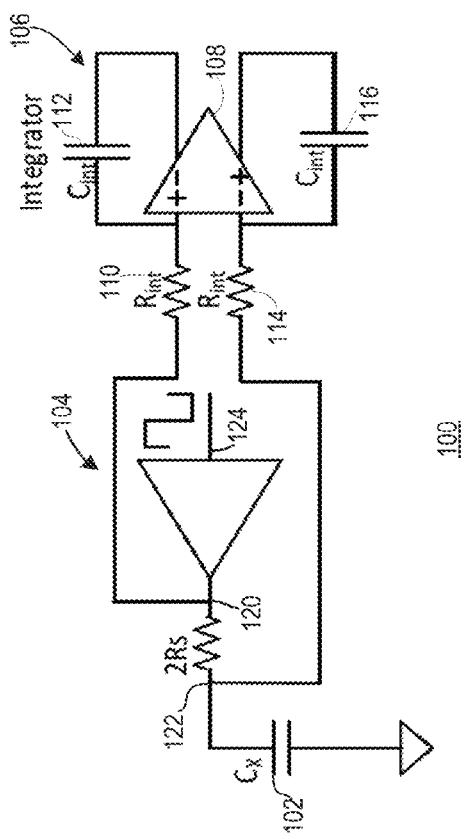
FIG. 1 is an example of a capacitance sensing circuit.

Capacitive touch sensing systems can be divided into two broad categories, self-capacitance based systems and mutual-capacitance based systems. In self-capacitance based systems, the capacitance of a sensor with respect to ground is measured. In mutual capacitance based systems capacitance across a pair of sensors is measured. Both types of systems find application in devices such as smart phones, tablets and other electronic devices.

In theory, self-capacitance of a conducting electrode is capacitance of the electrode in isolation such that all other conductors and charged surfaces are at an infinite distance away. In practice, it is not possible to have a completely isolated conductor in space. Other adjacent conductors such as signal lines, a metal case and the stack of layers forming the substrate of the capacitive sensor, add to the self-capacitance of a conductor or sensor. Hence in touch sensing technology, self-capacitance refers to capacitance of a sensor electrode with respect to all other conductors in the environment containing the conductor or sensor. For the most part, the self-capacitance of a sensor is simply given by the sum of all capacitances with respect to everything else close by. Hence, when a finger comes close to the sensor, it adds to the self-capacitance of the sensor. The variation in self-capacitance may be detected as the presence of the finger or the finger's interaction with the touch sensor.

In typical applications, the self-capacitance of touch sensors can be anywhere from 1 pF to 50 pF, depending how close the sensor is to other sensors, to LCD drive lines, to a shield layer, if there is one, and to adjacent sensors. Therefore, in self-capacitance based touch sensing solutions, it is well known that background capacitance can be a significant portion of the signal, especially in miniaturized compact systems. The source of such background capacitance is simply due to sensor substrate stack up and routing parasitic capacitance. However the actual signal of interest is less than one-tenth that of the background capacitance. This, in addition to variation in background capacitance, imposes constraint in the design of sensing circuitry to reduce gain so as not to saturate the sensing system, which reduces effective sensitivity. The sensitivity of such system is limited to:

$$\rho = \frac{\Delta C}{C_B},$$

where $C_B$ is the background self-capacitance and $\Delta C$ is the change in sensor capacitance due to presence of a finger or other object such as a stylus.

Various sensing techniques are known for sensing capacitance of a capacitive touch sensing system. Drive voltage and measure charge (DVMQ) is one sensing technique commonly used because of its relative simplicity and due to the sensing waveform on the sensors being independent of capacitance value being measured. The latter feature improves water immunity since, independent of the capacitance, all sensors have the same waveform. Having the same voltage across adjacent sensors eliminates sensing of mutual capacitance. By not sensing mutual capacitance, the system becomes immune to presence of water, which changes mutual capacitance. Next, operation of drive voltage measure charge (DVMQ) sensing technique is described.

In the DVMQ sensing technique, the capacitance to be measured is charged to a known voltage and is subsequently discharged. During charging and discharging, with measurement of the total amount of charge that went to the capacitor, it is possible to find capacitance using the following relation:

$$C_X = \frac{Q}{\Delta V},$$

where $\Delta V$ is the difference in applied voltage and Q is charge required to create $\Delta V$ amount of change in voltage across the unknown capacitance $C_x$. In order to find Q, it is necessary to integrate instantaneous current that goes to the capacitor. This can be done using a continuous time integrator circuit.

FIG. 1 shows an embodiment of a continuous time integrator circuit 100 suitable for the DVMQ sensing technique. The integrator circuit 100 includes a drive circuit 104 for driving voltage on a capacitor 102 to be sensed and an integrator 106. The drive circuit 104 includes an amplifier and series resistor to provide voltage and current drive. The integrator 106 includes an operational amplifier (op amp) 108, a first input resistor 110, a first integrator capacitor 112, a second input resistor 114 and a second integrator capacitor 116. The first input resistor 110 is coupled between an output 120 of the amplifier of the drive circuit 104 and a non-inverting input of the op amp 108. The first integrator capacitor 112 is coupled between an inverting output of the op amp 108 and the non-inverting input of the op amp 108 in a feedback arrangement. The second input resistor 114 is coupled between a sense node 122 at the capacitor 102 to be sensed and the inverting input of the op amp 108. The second integrator capacitor 116 is coupled between the non-inverting output of the op amp 108 and the inverting input of the op amp 108 in a feedback arrangement. Other circuit arrangements may be used to provide similar functionality.

The integrator circuit 100 operates as a continuous time integrator. A square wave input signal is provided to an input 124 of the amplifier of the drive circuit 104. The output of the integrator circuit 100 is the non-inverting output of the op amp 108. The output signal of the integrator circuit 100 is a square wave since the flow of charge is opposite during positive and negative edges of the signal. However if the polarity of addition is flipped during the negative edge of the signal, a staircase signal results. This is due to added charge to the integrating capacitor at every edge of the signal.

Figure 2:
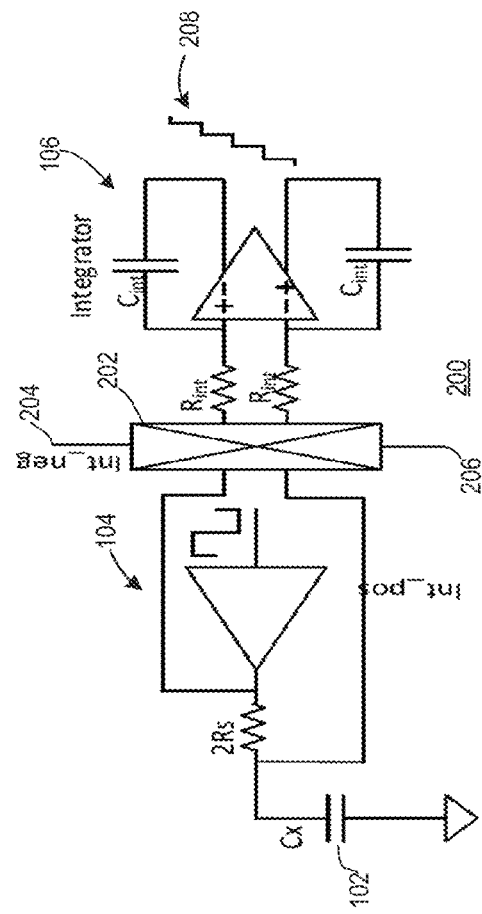
FIG. 2 is an example of a capacitance sensing circuit.

FIG. 2 is an alternative embodiment of a continuous time integrator circuit 200 suitable for the DVMQ sensing technique. In the integrator circuit 200, an inverting circuit 202 has been added between the drive circuit 104 and the integrator 106. The inverting circuit 202 includes control inputs 204, 206 configured to receive control signals from a control circuit (not shown). Any suitable circuitry may be used to implement the inverting circuit 202, either in digital logic or in analog switching circuitry, using proper timing. By timely application of suitable control signals to the control inputs 204, 206, the polarity of addition of the output of the integrator circuit 200 may be flipped during alternating positive and negative edges of the input signal. The result is a staircase signal 208 on the integrating capacitor.

The staircase signal can be represented as $$V_{int} = 2N \frac{R_S C_X}{(R_S + R_{int})C_{int}} \Delta V$$

where N represents the number of cycles of the input square wave signal.

FIG. 3 is a conventional embodiment of an integrator circuit 300 suitable for the DVMQ sensing technique. The integrator circuit 300 implements a switched capacitance based integrator. The integrator circuit 300 includes integrator 106, a first switch 302, and a second switch 304. The integrator 106 has an integrating capacitor $C_{int}$ coupled between the output and the inverting input. The non-inverting input is coupled to ground. The first switch 302 is couple between the sensed capacitor $C_x$ and the positive power supply. The second switch 304 is coupled between the sensed capacitor $C_x$ and the inverting input of the integrator. In this embodiment, the signal from only one edge of the square wave is integrated and hence sampling rate is reduced.

The first switch 302 and the second switch 304 may be implemented in any suitable fashion, such as by digital control logic. The opening and closing of the first switch 302 and the second switch 304 is controlled by control signals phi1 and phi2 from control circuitry (not shown). By application of appropriately timed control signals phi1, phy2 to the switches 302, 304, the integrator circuit 300 operates as a switched capacitor integrator. In this sensing technique, the output voltage after N integration cycles is only:

$$V_{int} = N \frac{C_X}{C_{int}} \Delta V$$

One disadvantage of this technique is that we get only one sample per cycle. So the discrete time sampling frequency is $f_s$, where $f_s$ is the sensing frequency, i.e., the frequency of control signals phi1 and phi2. Hence, for the same amount of energy expended, we get only half the number of samples compared to the continuous time version illustrated in FIG. 2. Also in continuous time version illustrated in FIG. 2, for $f_s$ switching frequency, we get $2f_s$ sampling frequency. In the presence of uniform broadband noise, the higher sampling frequency reduces noise folding by a factor of two and hence in-band noise spectral density is one-half in the continuous time version, which results in inherent doubling in signal to noise ratio (SNR). Some of the advantages of using first version of DVMQ sensing technique include obtaining twice the number of samples for same power, creating half the amount of noise folding in presence of broadband uniform noise, and built-in gain control based on a ratio of two resistors, $$\frac{R_S}{R_S + R_{int}}.$$

Feasible values of gain for the DVMQ sensing technique are limited by integrator saturation. As discussed above, the presence of background self-capacitance creates a large background signal which accumulates at each integration cycle if not cancelled. Hence, in DVMQ-based self-capacitance sensing systems, it is important to employ an offset cancellation technique. Then the gain can be increased and end-to-end system sensitivity can be improved.

Common Mode Offset and Noise Cancellation

The background self-capacitance in touch sensing systems is generally constant due to the fact that the majority of background self-capacitance is due to capacitance to ground plane or other conductors underneath or adjacent to the sensor. This constant offset can be substantially cancelled by measuring the average across the sensor panel and subtracting the average capacitance from all sensors. This method automatically accommodates environmental drifts in background self-capacitance as long as change is uniform across all sensors. In addition to common mode offset cancellation, this technique also offers common mode noise cancellation. In display integrated touch solutions, where the touch sensor is assembled to be adjacent to a display in a single electronic device, the noise from the display limits the overall SNR of the touch sensing system. However most of the noise from the display is common mode, when the noise is primarily due to voltage switching of the VCOM voltage, which is common to all pixels of the LCD display. Hence this component of noise, which is common across all sensors, can be cancelled out at the very beginning of signal processing.

FIG. 4 is an example plot of analog to digital conversion (ADC) level versus capacitance. As FIG. 4 illustrates, if background capacitance $C_B$ has $\Delta C_B$ variation across respective sensors of the sensor panel, to make sure all respective sensors are above 0 ADC value, the lower bound on the transfer function would need to be $0.5*\Delta C_B$ below $C_B$ and midrange value will be $0.5$ $(\Delta C_B + \Delta C_{max})$. As a result, sensitivity will nominally be:

$$\rho \approx \frac{\Delta C}{0.5(\Delta C_B + \Delta C_{max})}$$

Hence, assuming $\Delta C_B$ and $\Delta C_{max}$ are lower than mean $C_B$, we get net improvement in sensitivity. In addition to offset cancellation, this scheme also provides improved common mode noise rejection as discussed before. This is important in a display integrated embodiment.

Figure 5:
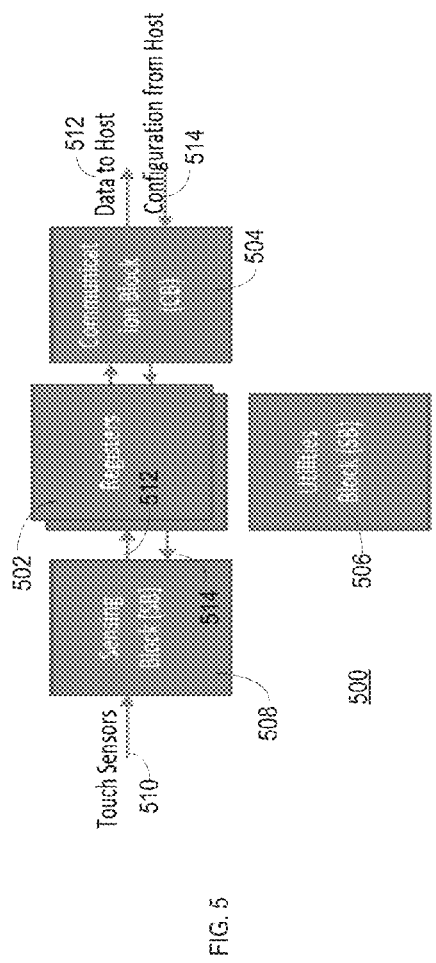
FIG. 5 is an example block diagram of a capacitive touch sensing system.

FIG. 5 is an example block diagram of a capacitive touch sensing system 500. The capacitive touch sensing system 500 may form a portion of an electronic device such as a smart phone, a tablet computer or other portable device. In some embodiments, the capacitive touch sensing system 500 may be integrated with a display such as an LED display so that the capacitive touch sensing system 500 is configured to sense contact with a touch surface which is adjacent to or coextensive with the display. The capacitive touch sensing system 500 detects which sensor or sensors of a plurality of sensors is activated by a touch and communicates information about the detected sensor or sensors to other circuitry of the electronic device for further processing.

The capacitive touch sensing system 500 in this example includes registers 502, a communication block 504 and utilities block 506 and a sensing block 508. Components of the capacitive touch sensing system 500, including the registers 502, the communication block 504, the utilities block 506 and the sensing block 508, may be arranged or partitioned in different ways than are shown here to provide the functions described here. These components may be integrated in a single integrated circuit such as a CMOS integrated circuit able to implement digital and analog circuitry. In other embodiments, these components may be integrated to various degrees at a system level, such as in two or more integrated circuits in electrical communication with one another.

The registers 502 include a plurality of memory storage locations for storing data for use by other components including the communication block 504, the utilities 506 and the sensing block 508. The registers 502 may include configuration registers for storing data to be used by other circuits, such as the utilities block 506, for configuring operation of the other circuits according to a particular operating mode of the capacitive touch sensing system 500. The registers 502 may also include sensor data registers for storing touch data received from the sensing block 508 and representative of one or more touches of a touch sensitive surface. The sensor data registers may thus be able to communicate data with the communication block 504 and the sensor block 508 to convey touch data from the sensor block 508 to the communication block 504 for communication to other circuits of an electronic device incorporating the capacitive touch sensing system 500.

The communication block 504 may include one or more communication circuits. Example functionality of the communication circuits of the communication block 504 includes storing data in the registers 502 to configure circuits of the capacitive touch sensing system 500 and reading digital data from the registers 502. The communication block 504 includes an output 512 and an input 514. The output 512 may include a digital data bus for data communication with a host device, such as a microprocessor or other data processing system. The output 512 may enable communication of sensor data determined by the sensor block 508 and stored in the registers 502 to the host. The input 514 is operable to receive data including configuration information from the host. Examples of configuration information include information to control and configure circuits of the sensor block and the utilities block 506. Such configuration information may be stored in memory such as configuration registers of the registers 502.

The output 512 and input 514 together may enable serial or parallel communication of data according to any convenient protocol. Examples of suitable protocols include Inter-Integrated Circuit (I²C) protocol and Serial Peripheral Interface (SPI) protocol. Suitable clocking, error correction and error detection and other communication features may be included to ensure reliable communication.

The utilities block 506 includes circuits which provide necessary auxiliary functions such as voltage regulation, reference voltage generation, sleep control logic, digital test logic and frequency oscillators. In one embodiment, the utilities block 506 contains various blocks required for analog circuits such as a low drop out voltage regulator, a bandgap voltage regulator, a low speed oscillator and a main oscillator. Also in the exemplary embodiment, the utilities block 506 contains sleep logic for controlling entry to and exit from a low power sleep mode, reset logic and test circuits. Further, in some embodiments, the utilities block 506 includes one or more digital to analog converter (DAC) circuits operative to convert digital data to analog signals. For example, the utilities block 506 also includes two eight-bit DAC circuits which can be used as a source for charging and discharging sensor capacitances, described in more detail below. The DAC output voltage is set by a register setting in a memory location of the registers 502.

The sensing block 508 performs functions including sequencing the touch sensing analog front end circuit, analog to digital converter (ADC) circuits and digital filter circuits. In an exemplary embodiment, the sensing block contains both analog circuitry and digital circuitry. In this embodiment, the sensing block 508 includes an analog front end (AFE) circuit configured to detect a touch of a touch sensor of the capacitive touch sensing system 500, an input 510 configured to be coupled to one or more touch sensors, an output 512 to provide touch information to the registers 502 and an input 514 configured to receive information from the registers 502. The input 510 may include multiple respective input nodes, each in electrical contact with a respective touch sensor. Alternatively, the input 510 may include one or more input nodes which are multiplexed in some suitable fashion, such as time multiplexing, to the touch sensors.

In operation, the sensor block 508 detects information received from touch sensors of the capacitive touch sensing system 500. Information is received as a change in a signal, such as a voltage, a current or a capacitance. In some embodiments, the touch sensors are arranged as an array or grid of conductors near a touch surface of a capacitive touch system. The touch sensors are coupled to one or more input nodes of the input 510. When an object such as a finger or stylus comes close to, touches or swipes over the touch surface, the capacitance of one or more touch sensors changes. The sensor block 508 detects the change as a change in voltage, current, capacitance or other signal and provides information about the change. The information is provided at the output 512 as digital data to memory of the registers 502. The communication block 504 can subsequently access the memory of the registers to receive the information stored by the sensor block 508 and communicate the information to other circuitry for further processing. The sensor block 508 may receive information such as configuration information at the input 514 from the registers 502. For example, the configuration information may include information to set an operational mode of the sensor block 508. The configuration information may be written to memory in the registers 502 by the communication block 504 or by the utilities 506.

Figure 6:
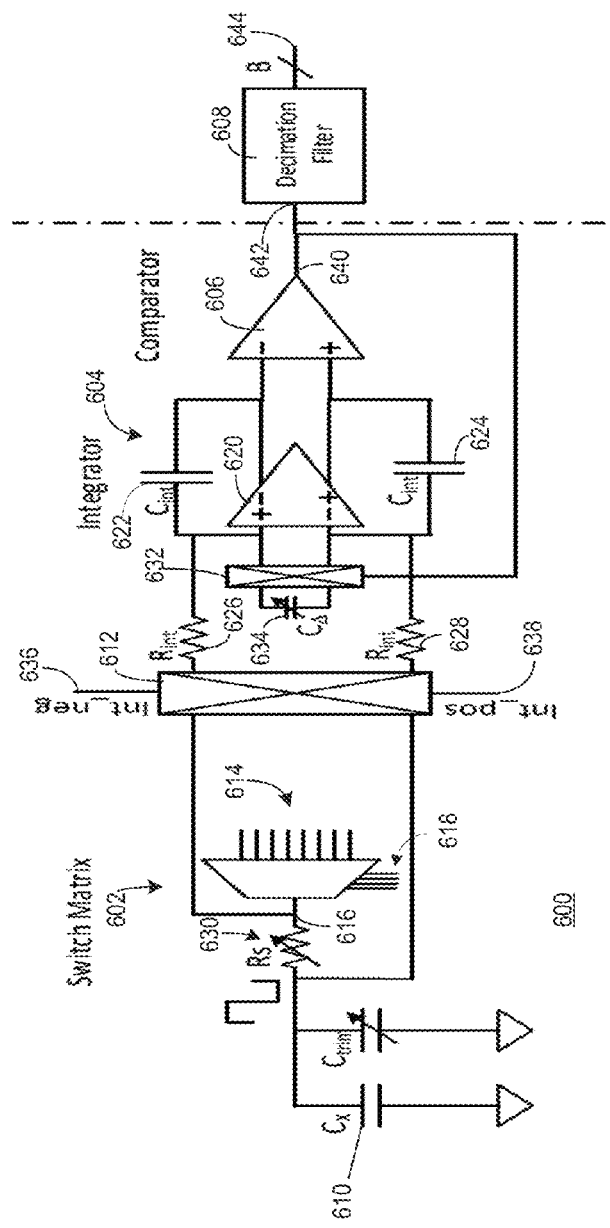
FIG. 6 is a block diagram of a simplified analog front end (AFE) circuit.

FIG. 6 is a block diagram of a simplified automatic front end (AFE) circuit 600. The AFE circuit 600 performs touch sensing, which measures capacitance connected to sensor input nodes, and provides as an output digital equivalent data after analog to digital (ADC) conversion. The AFE circuit 600 in the exemplary embodiment includes a switch matrix 602, an integrator 604, a comparator 606, and a decimation filter 608. In other embodiments, additional circuitry may be included or substituted, as will be recognized by those of ordinary skill in the art. For example, in the illustrated embodiment, the AFE circuit 600 includes a polarity switch 612. Further, in the exemplary embodiment, the switch matrix 602, the integrator 604 and the comparator 606 are built in analog circuitry and the decimation filter is built in digital circuitry. The AFE 600 is operative to detect a value of an unknown sensor capacitance $C_x$ 610 which may be one of the touch sensors of a capacitive touch panel.

The switch matrix 602 in this example is embodied as a nine-pole, single-throw (9PST) switch. The switch matrix 602 has an input 614, an output 616 and a control input 618. The input 614 is coupled to a plurality of input signals as will be discussed in greater detail below. The output 614 is coupled through the polarity switch to the integrator 604 and directly to the unknown sensor capacitance $C_x$ 610. The control input 618 is coupled to a plurality of control signals. In operation, the control input 618 receives one or more control signals as an input in accordance with a current operating mode of the AFE circuit 600. In response to the received control signals, the switch matrix 601 couples one of the input signals at the input 614 to the output 616. The switch matrix may be formed from any suitable components, such as an array of transistors operative to select one of the signals at the input 614 in response to the control signal at the control input 618. Design and implementation of the switch matrix 602 is well within the skill of the ordinarily skilled circuit designer.

The integrator 604 in this simplified example includes an operational amplifier 620, first capacitor 622, second capacitor 624, a first input resistor 626, a second input resistor 628, sense resistor $R_s$ 630, switch 632 and capacitor 634. The operational amplifier 620 has an inverting input labelled with a minus sign and a non-inverting input labelled with a plus sign. Similarly, the operational amplifier 620 has an inverting output labelled with a minus sign and a non-inverting input labelled with a plus sign.

The first input resistor 626 is coupled between the sensor capacitance $C_x$ 610 and a non-inverting input of the operational amplifier 620. The first integrator capacitor 112 is coupled between an inverting output of the operational amplifier 620 and the non-inverting input of the operational amplifier 620 in a feedback arrangement. The second input resistor 114 is coupled between the sensor capacitance $C_x$ 610 and the inverting input of the operational amplifier 620. The second integrator capacitor 624 is coupled between the non-inverting output of the operational amplifier 620 and the inverting input of the operational amplifier 620 in a feedback arrangement. Other circuit arrangements may be used to provide similar functionality.

The integrator 604 operates as a continuous time integrator. A square wave input signal is provided to the output 616 of the switch matrix 602. The output of the integrator 604 is the combination the non-inverting output of the operational amplifier 620 and the inverting output of the operational amplifier 620. The output signal of the integrator 604 is a square wave since the flow of charge is opposite during positive and negative edges of the signal. With the addition of the polarity switch 612, the output signal becomes a staircase signal (as in FIG. 2) as a result of added charge to the integrating capacitors on every edge of the square wave signal applied to the sensor capacitance $C_x$ 610. Operation of the polarity switch 612 is controlled by control signals applied to control inputs 636, 638.

The comparator 606 has an inverting input, labelled with a minus sign in FIG. 6, coupled to the inverting output of the integrator 604. Further, the comparator 606 has a non-inverting input, labelled with a plus sign, coupled to the non-inverting output of the integrator 604. The comparator 606 has a single-ended output 640.

The comparator 606 provides sigma-delta analog to digital conversion. The integration result provided by the integrator 604 needs to be quantized for evaluation and further processing. The comparator 606 provides a simple differential comparison circuit following the integrator 604 and functions as a quantizer.

The decimation filter 608 has an input 642 coupled to the output 640 of the comparator 606 and an output 644. The decimation filter 608 may be implemented as a digital counter. The decimation filter 608 counts the number of positive and negative comparison results received from the comparator 606. In some embodiments, the analog to digital conversion process provided by the comparator 606 and the decimation filter 608 can be configured to have 10 to 16 bit resolution. The output of the decimation filter 608 is provided to the output 644 and may be a multi-bit digital value.

In one embodiment, the AFE circuit 600 operates in six phases per sensing cycle. These phases are labelled as reset/compare; charge; discharge; setup; common mode share or cm_share; and integrate. Every cycle starts with a reset phase during which the operational amplifier 620 of the integrator 604 is set up as a continuous time integrator and capacitors 622, 624 are reset to a predetermined voltage or state.

During the charge phase, the sensor capacitance $C_x$ 610 is driven high and current is integrated into the integrator 604 and the sigma-delta analog to digital converter formed by the comparator 606 and the decimation filter 608 in continuous time.

During the discharge phase, the polarity switch is reversed by appropriate application of the control signals to the control inputs 636, 638. The sensor capacitance $C_x$ 610 is driven low and current is integrated into the same integrator 604 but with opposite polarity such that the two charges are additive.

After the discharge phase, in the setup phase, the difference in input common mode versus output common mode is cancelled by subtracting two half charges.

During the cm_share phase, half of the charge is shared with other AFE circuits and averaged. At the end of the cm_share phase, one of the integrator capacitors 622, 624 will have average charge.

In the integrate phase, the average charge is subtracted from the other half of the charge left at the integrator 604 and the integrator 604 is reconfigured as a switched capacitor integrator using the other two capacitors and $Q_A$ amount of charge is either added to or subtracted from the integration based on the previous comparison result. Hence, the integrator 604, instead of simply integrating the common mode cancelled signal, integrates the error signal of the sigma-delta analog to digital converter. This error signal is the difference between the previous integration, the current common mode cancelled signal and $Q_A$, which is the full scale value of the sigma-delta analog to digital converter.

Subsequently, during the reset phase of the next cycle, the integration result is quantized using the comparator 606, which outputs a positive or negative signal for the up-down counter formed by the decimation filter.

At the end of N cycles, the sigma-delta analog to digital converter and the integrator capacitors 622, 624 of the integrator are reset and the next analog to digital conversion begins. The resolution of the analog to digital conversion is then given by:

$$B = \log_2(N)$$

The detailed working of the integrator and ADC will be described in subsequent sections.

FIGS. 7-14 are a series of exemplary circuit diagrams illustrating configuration of the analog front end circuit 600 of FIG. 6 during operation of the AFE circuit in various respective operating modes. In each of FIGS. 7-14, generally only active circuit elements are shown. In the exemplary embodiments, circuit elements such as operational amplifiers, resistors and capacitors may be added to and removed from active operation in the AFE circuit 600 or even reconfigured to perform a different function. This may be done in any suitable manner, such as by use of one or more transistors as switches to electrically couple or isolate the respective circuit elements to other active elements to form the necessary circuitry. Further, this reusing of components may be done cyclically over time, through a sequence of operational phases, to process received signals. Reusing components in this manner allows reduction in the total number of components, meaning less circuitry is required, so that a smaller integrated circuit can be built and therefore be built less expensively and more reliably. Further, this technique of reusing circuit components allows backend digital circuitry to have to do less data processing, compared to conventional implementations.

Configuration and reconfiguration of circuit components, to enable reuse of the same components in different sequential phases of operation, may be achieved by providing configuration data which is selected to properly configure the components to form the necessary circuits for each respective phase. In the example of FIG. 5, configuration data may be written to the registers 502 by the communication circuit 504 or the utilities 506 and read from the registers by the sensing block 508. The configuration data may be preset for each respective operating mode of the capacitive touch sensing system 500. When the configuration data are read by the sensing block 508, the configuration data are used to electrically couple or isolate the respective circuit elements to other active elements to form the necessary circuitry required for the particular operating mode. Implementation of the necessary switching circuitry to achieve the functionality described herein is within the skill of the ordinarily-skilled circuit designer.

Figure 7:
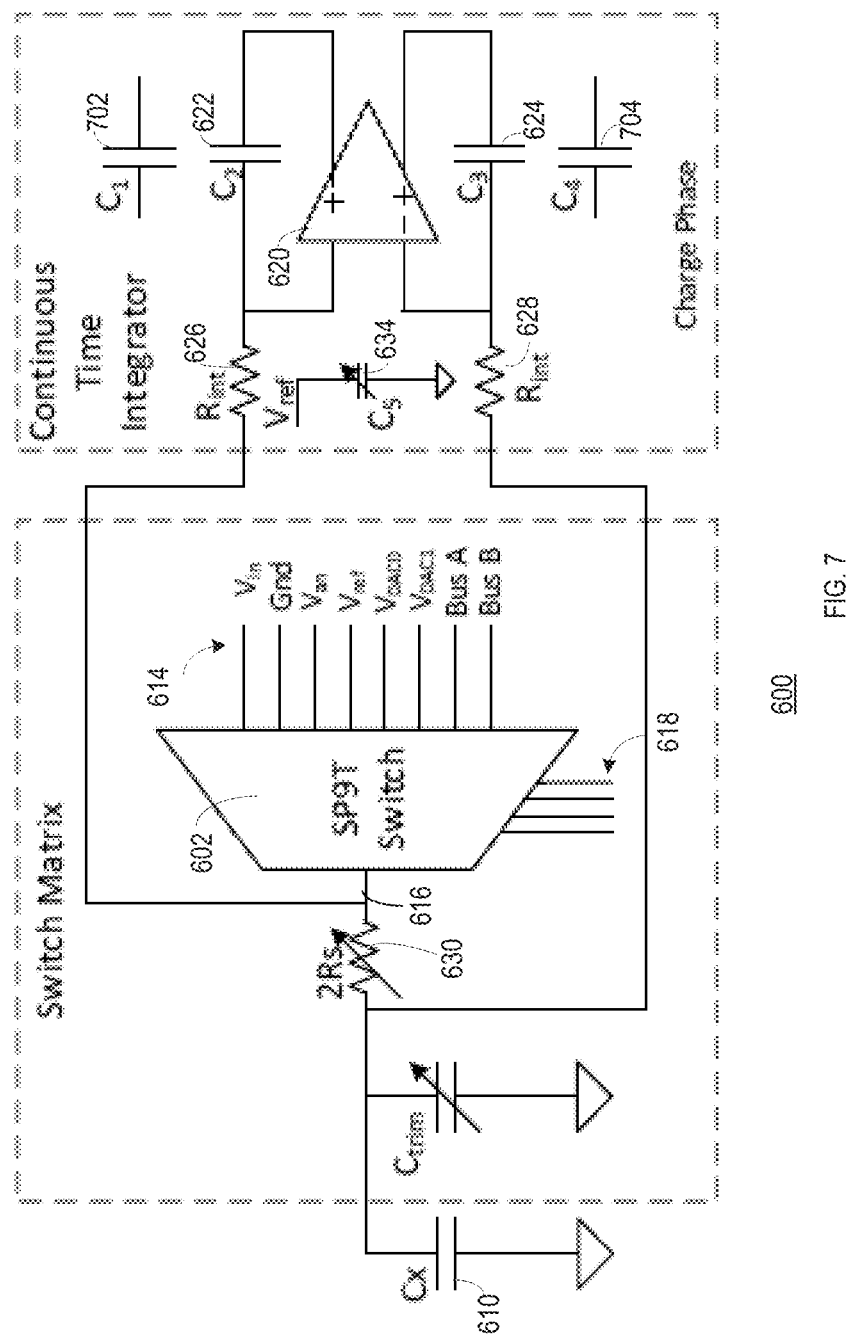

FIG. 7 illustrates configuration of the AFE circuit 600 during a charge phase of operation. Only relevant circuit elements active during the charge phase of operation are shown in FIG. 7. During the charge phase of operation, the integrator 604 integrates the charges that went into charging the sensor capacitance Cx 610 by integrating voltage across sense resistor $R_s$ 630. Current is applied through the sense resistor $R_s$ 630 and through the switch matrix 602. The input 614 to the switch matrix 602 is coupled to a plurality of input signals. In the example, these input signals include an input voltage labelled $V_{in}$, a ground potential labelled GND, reference voltages labelled $V_{an}$, $V_{ref}$, $V_{DAC0}$, $V_{DAC1}$, BusA and BusB. Other signals may be supplied in addition or instead. The control input 618 receives control signals to select one of the input signals, such as Vin, to apply to the output 616 of the switch matrix 602 for charging the sensor capacitance Cx 610.

During the charge phase, voltage $V_{an}$ is applied through the switch matrix 602 to the sensor capacitance Cx 610. The charge that goes into charging the sensor capacitance $C_x$ 610 is scaled according to resistor ratio $R_s/(R_s+R_{int})$ and is integrated into the integration capacitors $C_2$ 622 and $C_3$ 624. Half of the total charge goes into each respective capacitor 622, 624. The final output voltage at the end of this charge phase cycle is given by the following relation:

$$V_{int} = \frac{1}{C_{2,3}} \int \frac{i_{Cx}(t)^* R_S}{R_S + R_{int}} dt$$

Where $$\int i_{Cx}(t) dt = C_x V_{an}$$

Hence, $$V_{int} = \frac{R_S}{C_{2,3}(R_S + R_{int})} \int i_{Cx}(t) dt = \frac{R_S}{C_{2,3}(R_S + R_{int})} C_x V_{an} = \frac{Q_S}{C_{2,3}}$$

In the example, the charge phase is nominally 500 ns in duration, but the duration including the number of clock cycles is programmable via register setting in the registers 502.

Figure 8:
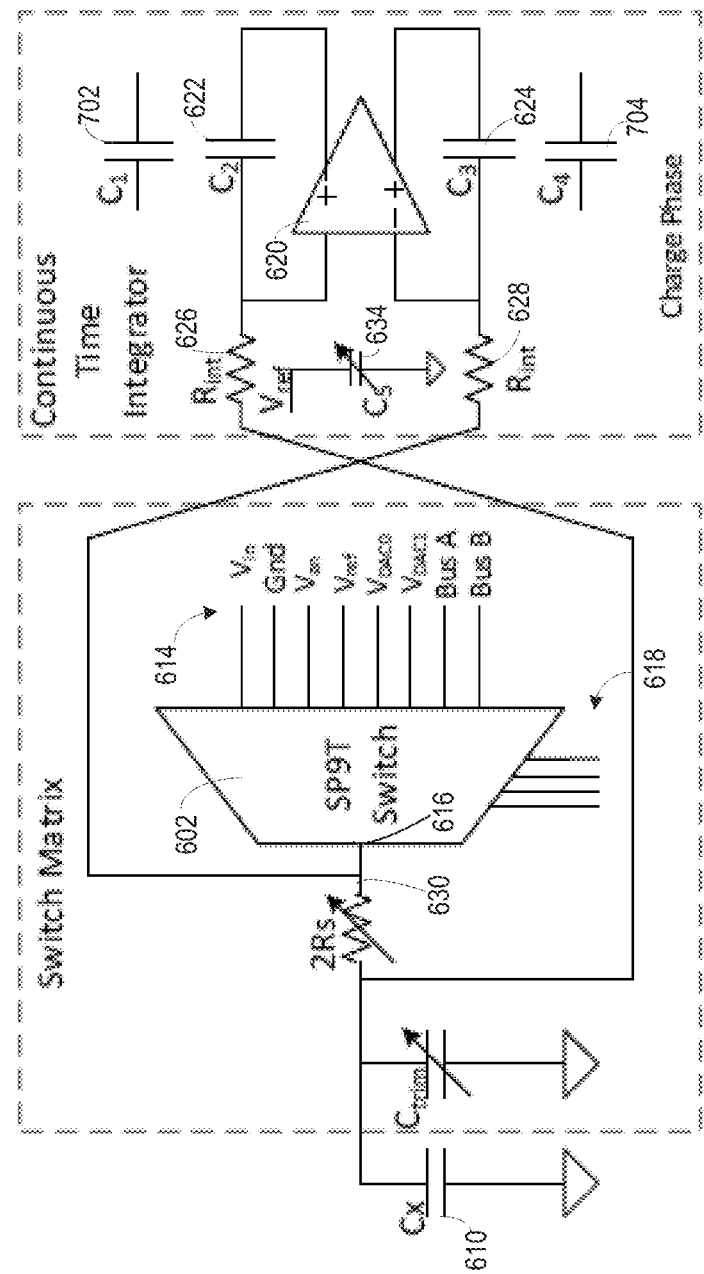

FIG. 8 illustrates configuration of the AFE circuit 600 during a discharge phase of operation. Only relevant circuit elements active during the discharge phase of operation are shown in FIG. 8. The discharge phase is similar to charge phase described above in conjunction with FIG. 7. Discharge current from the sensor capacitor $C_x$ 610 is integrated onto the integrating capacitors $C_2$ 622 and $C_3$ 624 and is added to the previous integration. Since the discharge current is in opposite direction to the charge current, to make the two additive, the terminals of the integrator are flipped as shown in FIG. 8. In the discharge phase of the example, the polarity of charging is reversed by actuating the polarity switch 612 (FIG. 6). This may be done by applying appropriate control signals to the control inputs 636, 638.

At the end of a pair of charge and discharge phases, the integration result will be:

$$V_{int} = \frac{2R_S}{(R_S + R_{int})C_{2,3}} C_X V_{an} = \frac{2Q_S}{C_{2,3}}$$

The factor of two is a result of integrating both edges of the charging waveform applied to the sensor capacitor $C_x$ 610. FIG. 7 and FIG. 8 show that additional storage capacitors $C_1$ 702 and $C_4$ 704 are included during the charging phase and the discharging phase. As is the case with other circuit elements in the example embodiment, capacitor $C_1$ 702 and capacitor $C_4$ 704 may be selectively included or omitted from the AFE circuit 600. In particular, capacitor $C_1$ 702 and capacitor $C_4$ 704 may be coupled in parallel with integrating capacitors $C_2$ 622 and $C_3$ 624. In both the charge phase and the discharge phase, $C_1$ 702 and $C_4$ 704 hold the integration result from previous cycle and capacitor $C_5$ 634 is charged to the reference voltage $V_{ref}$. Vref may be any suitable voltage and may be generated, for example, in the utilities 506 (FIG. 5). Preferably capacitor $C_1$ 702 and capacitor $C_4$ have the same value of capacitance.

In the example, the discharge phase is nominally 500 ns in duration. However, this value in the example is programmable via register setting in the registers 502.

FIG. 9 illustrates configuration of the AFE circuit 600 during a setup phase of operation. Only relevant circuit elements active during the setup phase of operation are shown in FIG. 9.

At the end of the charge-discharge phases, the input common mode of the integrator 604 will be at 0 and output common mode will be at amplifier output common mode such as $V_{dd}/2$. The extra charge on the integrating capacitors 622, 624 due to this difference in common mode has no signal component and is uninteresting. In addition, it makes it impossible to subtract common mode signal across channels in presence of this additional charge. The actual charge on each capacitor $C_2$ 622 and capacitor $C_3$ 624 at the end of the discharge phase is:

$$Q_{C2} = +0.5 * V_{dd}C_2 + Q_S$$

$$Q_{C3} = -0.5 * V_{dd}C_3 + Q_S$$

Hence during this setup phase, the two capacitors $C_2$ 622 and $C_3$ 624 are connected so that the extra common mode charge cancel and only signal charge remains. During the setup phase, the operational amplifier 620 is not used and it is set up in a unity gain configuration to avoid railing. The capacitor $C_1$ 702 and capacitor $C_4$ 704 still hold the previous integration result and capacitor $C_5$ 634 remains charged to $V_{ref}$. At the end of the setup phase, capacitor $C_2$ 622 and capacitor $C_3$ 624 will have combined charge equal to:

$$Q_{C2} + Q_{C3} = 0.5*(V_{dd}C_2 - V_{dd}C_3) + Q_S + Q_S = 2Q_S = \frac{2R_S C_X V_{an}}{(R_S + R_{int})}$$

Hence $$Q_{C2} = Q_{C3} = Q_S$$

Hence, at the end of the setup phase, each of capacitor $C_2$ 622 and capacitor $C_3$ 624 will have half the signal charge, respectively. In one embodiment, the setup phase has duration of 120 ns.

FIG. 10 illustrates configuration of the AFE circuit 600 during a common mode share or cm_share phase of operation. Only relevant circuit elements active during the cm_share phase of operation are shown in FIG. 10.

The cm_share phase of operation relates to common mode operation among the plurality of channels of the capacitive touch sensing system 500. Each channel includes an analog front end circuit analogous to AFE circuit 600. Each channel is electrically coupled to one sensor in order to detect the value of a sense capacitor analogous to sense capacitor $C_x$ 610. The plurality of channels, including the AFE 600 and analogous AFE circuits, are part of the sensor block 508 (FIG. 5).

Since at the end of the setup phase (FIG. 9), half of the signal charge is on either of the two capacitors $C_2$ 622 and $C_3$ 624, it is now possible to find the common mode signal across all channels by sharing one of the capacitors $C_2$ 622 and $C_3$ 624 of all the channels. Doing this will inherently set all capacitors to the same voltage and hence they will have the same charge, which is the average charge across all channels. In the example, capacitor $C_3$ 622 of each channel or AFE circuit is coupled in parallel with each other capacitor $C_3$ 622 using a common mode bus 1002. This coupling may be achieved by selecting switching devices such as the capacitor $C_3$ 622 in and out of the circuit and into communication with the common mode bus.

At the end of the cm_share phase, capacitor C3 622 of each channel will have:

$$Q_{C3} = Q_{AVG} = \frac{1}{M+1} \sum_{i=1}^{M} Q_{C3,i} = \frac{1}{M+1} \sum_{i=1}^{M} Q_{S,i}$$

The cm_share phase in the example is 120 ns in duration. Division by M+1 is required since the common mode circuit didn't have any charge to begin with.

FIG. 11 illustrates configuration of the AFE circuit 600 during the integrate phase of operation. Only relevant circuit elements active during the integrate phase of operation are shown in FIG. 11.

At the end of the cm_share phase (FIG. 10), capacitor C1 702 and capacitor C4 704 will be holding the previous integration result. Capacitor C2 622 will store charge $Q_S$. Capacitor C3 624 of each channel will have an average charge and capacitor C5 634 will have full scale charge. During the integrate phase, all these signals are added together such that resultant charge appears on capacitor $C_1$ 702 and capacitor $C_4$ 704. The charge from capacitor $C_5$ 634 will be either added or subtracted based on the result of the previous comparison.

Finally at the end of the integrate phase, the total charge on capacitor $C_1$ 702 and capacitor $C_4$ 704 is given by:

$$Q_{C1}(n)+Q_{C4}(n)=Q_{C1}(n-1)+Q_{C4}(n-1)+Q_S-Q_{AVG}+D(n-1)*Q_{C5}$$

Due to symmetry of the operational amplifier 620 and since capacitor $C_1$ 702 and capacitor $C_4$ 704 are preferably equal in value, this charge is split equally between capacitor $C_1$ 702 and capacitor $C_4$ 704. The resulting voltage is positive if the charge is positive and vice versa. Due to negative feedback of the sigma-delta analog to digital converter, if the voltage is positive in $(n-1)^{th}$ cycle, the charge on capacitor $C_5$ 634 is subtracted in the $n^{th}$ cycle and if it is negative in $(n-1)^{th}$ cycle, the charge is added in the $n^{th}$ cycle. In steady state, the closed loop tries to maintain the voltage at the integrator as close to zero as possible. In the example, the integrate phase has a duration of 120 ns.

The final phase of operation is a compare phase. For sigma-delta analog to digital converter operation, the integration result needs to be quantized. The comparator 606 forms a simple differential comparator following the integrator 604 and functions as a quantizer. In this phase, the integrator 604 is kept in the same state as in the integrate phase as illustrated in FIG. 11, and the comparator 606 is enabled for comparison. Before this phase, the comparator 606 may be held in reset state. The comparator 606 detects whether the output voltage from the integrator 604 is positive or negative and drives either one of the two lines high. The comparator 606 preferably decides the state of the integrator 604 within 120 ns. At the end of compare phase, the result is latched in memory.

Figure 12:
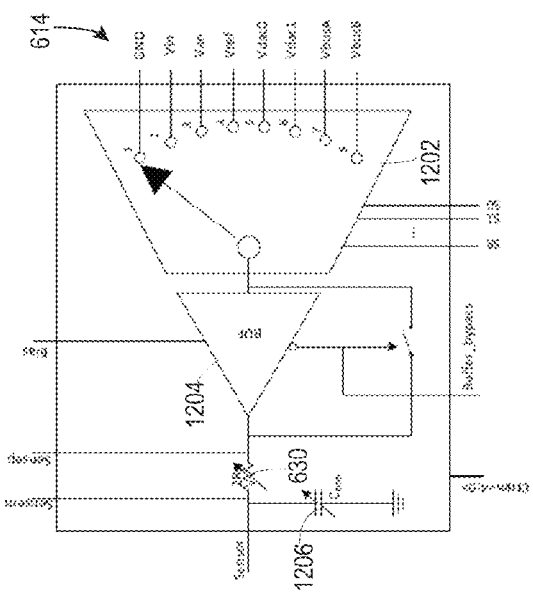
FIG. 12 is an example block diagram of a switch matrix suitable for use in the analog front end circuit of FIG. 6.

FIG. 12 is an example block diagram of a switch matrix 602 suitable for use in the analog front end circuit 600 of FIG. 6. The switch matrix 602 includes a switch circuit 1202 and a buffer circuit 1204. The switch matrix 602 serves as a programmable, versatile drive voltage selector, which allows for programming the voltage that is driven on to the sensors during each phase.

The switch circuit 1202 of the switch matrix 602 in the example embodiment can select from nine different voltage sources to drive during the charge phase and the discharge phase. Thus, the switch circuit 1202 operates as a single pole, nine throw (SP9T) switch. Selection is performed according to selection programming data which operates to enable the necessary switching components of the switch circuit 1202, such as transistors, to complete a circuit path from the input 614 to the output of the switch matrix 602.

Data to enable the switch circuit 1202 to select a particular voltage for a particular operating mode may be stored in the registers 502 for access by the sensing block 508 (FIG. 5). In one example, there are two copies of the required selection programming data stored in the registers. A first copy of the selection programming data applies when the sensor is being sensed. A second copy of the selection programming data applies when sensor is not being sensed. The second set of register parameters set the guarding voltages during the charge phase and the discharge phase when the sensor is not being sensed.

The buffer circuit 1204 operates to provide necessary current drive and voltage amplification. The buffer circuit 1204 buffers weak drive voltages such as $V_{ref}$, $V_{dac0}$ and $V_{dac1}$. The buffer is disabled and is in tri-state or a high impedance state when selecting other voltages.

In addition to the buffer and SP9T switch, the switch matrix 602 also contains sense resistor 630 and programmable trim capacitor $C_{trim}$ 1206. The trim capacitor 1206 will be used to adjust the background capacitance of various channels such that they are within smaller range.

Figure 13:
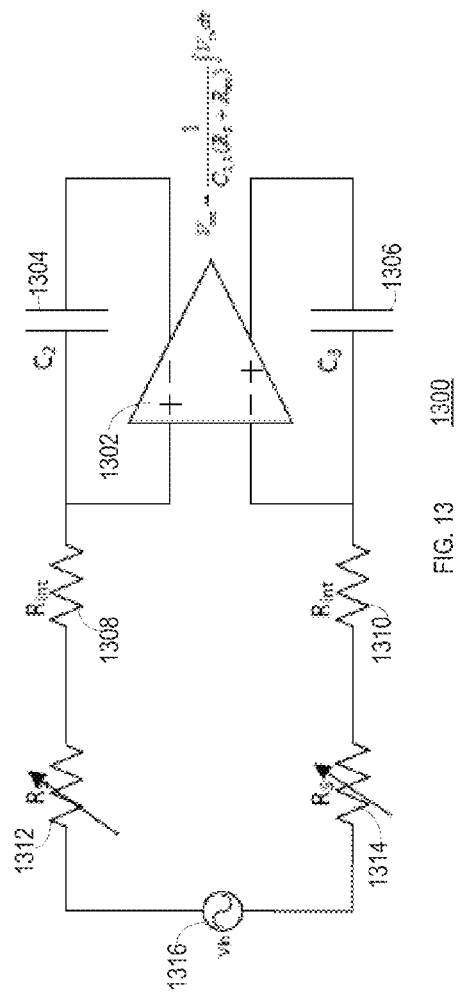
FIG. 13 is an example circuit diagram illustrating operation of a continuous time integrator suitable for use in the analog front end circuit of FIG. 6.

FIG. 13 is an example circuit diagram illustrating operation of a continuous time integrator 1300 suitable for use in the analog front end circuit 600 of FIG. 6. The integrator 1300 includes an operational amplifier 1302, a first integration capacitor 1304, a second integration capacitor 1306, a first integration resistor 1308, a second integration resistor 1310, a first sense resistor 1312 and a second sense resistor 1314. The operational amplifier 1302 has an inverting input, indicated by a minus sign, and a non-inverting input, indicated by a plus sign, as well as an inverting output, indicated by a minus sign, and a non-inverting output indicated by a plus sign. The operational amplifier 1302 may be any circuit suitable for performing the functions described herein. The first integration capacitor 1304 is coupled between the inverting output of the operational amplifier 1302 and the non-inverting input of the operational amplifier 1302. The second integration capacitor 1306 is coupled between the non-inverting output of the operational amplifier 1302 and the inverting input of the operational amplifier 1302. The first integration resistor 1308 is coupled between the non-inverting input of the operational amplifier 1302 and the first sense resistor 1312. The second integration resistor 1310 is coupled between the inverting input of the operational amplifier 1302 and the second sense resistor 1314. For modelling, a voltage source is coupled between the first sense resistor 1312 and the second sense resistor 1314.

Each AFE circuit 600 of the capacitive touch sensing system 500 contains a fully differential voltage integrator 1300 with variable integration resistors $R_{int}$ 1308, 1310 which allows changing gain of the integrator 1300. The $R_{int}$ values of the integration resistors 1308, 1310 for each channel are programmable in the registers 502. The value REG may be written to a storage location in the registers 502 and subsequently read from the storage location to program the integrator 1300. The value of $R_{int}$ is given by:

$$R_{int}=REG*R_S,$$

where $R_S$=50 ohm.

The input signal $V_{in}$ is the thevenin equivalent voltage across sensing resistor $2R_S$ through which the charging and discharging current flows. Hence, $$V_{in}(t)=2R_S i_C(t)$$

Where $i_C(t)$ is the instantaneous current into and from the sensor capacitor. Hence the continuous time integrator 1300 integrates the instantaneous current into and from the sensor capacitor, which is equal to the total charge flowing into and from the capacitor.

The continuous time integrator 1300 is formed by reusing the operational amplifier 1302 inside the switched capacitor (SC) integrator of a sigma-delta analog to digital converter. The operational amplifier 1302 is configured as a continuous time Integrator in the charge phase and the discharge phase.

Figure 14:
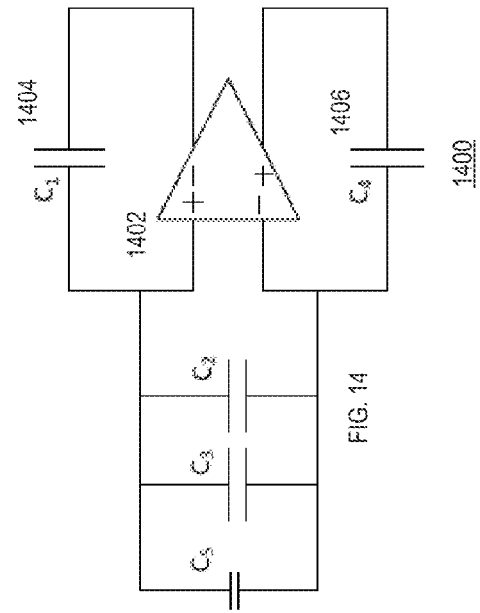
FIG. 14 is an example circuit diagram illustrating operation of a switched capacitor integrator suitable for use in the analog front end circuit of FIG. 6.

FIG. 14 is an example circuit diagram illustrating operation of a switched capacitor integrator 1400 suitable for use in the analog front end circuit 600 of FIG. 6. The integrator 1400 includes an operational amplifier 1402, a first integration capacitor 1404, a second integration capacitor 1406. The operational amplifier 1402 has an inverting input, indicated by a minus sign, and a non-inverting input, indicated by a plus sign, as well as an inverting output, indicated by a minus sign, and a non-inverting output indicated by a plus sign. The operational amplifier 1402 may be any circuit suitable for performing the functions described herein. The first integration capacitor 1404 is coupled between the inverting output of the operational amplifier 1402 and the non-inverting input of the operational amplifier 1402. The second integration capacitor 1406 is coupled between the non-inverting output of the operational amplifier 1402 and the inverting input of the operational amplifier 1402.

As mentioned above, a single operational amplifier 1402 may be shared between continuous time integration and switched capacitor integration. The operational amplifier 1302 is configured as a continuous time integrator 1300 in the charge phase and the discharge phase, FIG. 13. In the setup phase and the cm_share phase, the operational amplifier 1400 is not used and is configured in unity gain configuration to avoid outputs from railing. During the Integrate phase, the operational amplifier 1400 is configured as a switched capacitor Integrator 1400 formed by integration capacitors 1404, 1406.

In the switched capacitor integrator configuration illustrated in FIG. 14, the operational amplifier 1402 integrates charge from C2, C3 and C5 onto C1 and C4. The polarity of charge addition from capacitor C5 depends on the previous comparison result. The charge from capacitor C2 is added and charge from capacitor C3 is subtracted. The net result of this integration results in integration of common mode cancelled signal charge and charge from a 1 bit digital to analog converter formed by capacitor C5 onto capacitor C1 and capacitor C4. Hence, this switched capacitor Integrator 1400 also becomes the integrator inside a sigma-delta analog to digital converter.

The sigma-delta analog to digital converter is integrated into the AFE integrator to save power and area. This design allows for signal acquisition, common mode cancellation and analog to digital conversion using one operational amplifier, five capacitors and a comparator, as shown in FIG. 6 for example. This results in an elegant, highly efficient architecture which not only reuses circuits but also charge which is often wasted in switched-capacitor (SC) circuit topologies.

The sigma-delta analog to digital converter operates by integrating error signal, which is the difference between signal charge and digital to analog conversion charge from capacitor C5 in FIG. 14. If the integrated error signal is positive, the digital to analog conversion charge is subtracted and vice versa in next cycle to keep the integrator close to zero differential charge. The sign of the integrator (+1 or −1) at each sensing cycle represents the signal.

Subsequent to the comparator 606, an up-down counter, which is formed by decimation filter 608, counts the number of positive and negative comparison results. The analog to digital converter can be configured to have 10 to 16 bit resolution based on number of cycles per analog to digital conversion. After N sensing cycles, the resulting value is proportional to the signal. If the signal is more positive, it will require more number of cycles in which digital to analog conversion charge is subtracted and hence the output will have more +1 values and vice versa. The up-down counter will have a reset value according to register setting per channel and hence allows for negative signal. Negative signal is possible when doing common mode cancellation since some channels can have self-capacitance lower than average.

The sensing block 508 (FIG. 5) contains an additional common mode sensing circuit for common-mode signal generation. Unlike other sensing circuits, which are each coupled to a sensor of the capacitive touch sensor device, the common mode sensing circuit is not coupled to a sensor. The output of this channel is generally proportional to the average value of all the channels. Except for the origin of the signal, the common mode sensing circuit is identical to other sensing circuits which sense the state of the sensors of the capacitive touch sensor device. The common mode sensing circuit thus provides a circuit to cancel systematic errors. Since there is no capacitance attached to the common mode sensing circuit, it will only convert average charge from all sensing circuits. During sequential self-capacitance sensing mode, the common mode sensing circuit operates as the only operational sensing circuit and an additional switch from the common mode sensing circuit is activated to connect the input of the common mode sensing circuit to a communication bus. In this manner, the common mode sensing circuit connects to the communication bus and the communication bus connects sequentially to all other sensing circuits. During the time when a sensing circuit is connected to the communication bus, its scan parameters are used for the common mode sensing circuit rather than the sensing circuit itself. Details of operational modes will be described in following section.

Sensing Sequencer

The capacitive touch sensing system 500 (FIG. 5) in exemplary embodiments includes a sensing sequencer. The sensing sequencer is a state machine which sequences through respective sensing phases and states. The sensing sequencer provides timing and control for all the analog blocks used in the AFE circuit 600 (FIG. 6). Based on the configuration registers, the AFE circuit 600 can be operated in 3 modes:

Parallel Self-Capacitance Sensing Mode (PSS Mode)
Sequential Self-Capacitance Sensing Mode (SSS Mode)
Coded Mutual-Capacitance Sensing Mode (CMS Mode)

These three modes can be described based on three nested for loops or state machines. First is Channel Sequencer, which sequences through enabled channels in SSS Mode. Each channel includes an AFE circuit 600. Second is Scan Sequencer which sequences through N number of sensing cycles. Lastly Phase Sequencer sequences through 6 phases. Following describes various terminologies used and corresponding hierarchy.

1 FRAME=1 SCAN per channel
1 SCAN=N(=2B) Number of SENSING CYCLES
1 SENSING CYCLE=6 PHASES
Modes of Operation
PSS Mode In PSS Mode, all enabled sensors are driven simultaneously and the current going into each sensor is integrated simultaneously. During the charge phase and the discharge phase, each sensor is connected to one of the nodes according to the configuration register of each channel. During the setup phase, the cm_share phase, the integrate phase and the compare phase, the operational amplifier of the AFE circuit is configured as described above. The analog to digital conversion happens substantially simultaneously on all channels as sensing is taking place.

Before any analog to digital conversion (N=$2^B$ sensing cycles), the sensing sequencer will reset all capacitors and reset the decimation filter to a reset value in the reset phase. After analog to digital conversion, the sensing sequencer will continue sensing and acquire more data until frame buffers configured to store data are full. The analog to digital conversion data is sequenced through digital filters and finally into the frame buffers.

After each frame, the filtered data is transferred to the frame buffers and one of signals DATA_IRQ_A or DATA_IRA_B is asserted. This in turn results in asserting of a signal on an IRQ pin indicating availability of data to the host. The sensing sequencer continues to acquire another frame of data to fill the frame buffers. But at the end of second frame, if the data hasn't been read by the host and if both IRQ signals are still asserted, the sequencer goes to a low power sleep mode.

Figure 15:
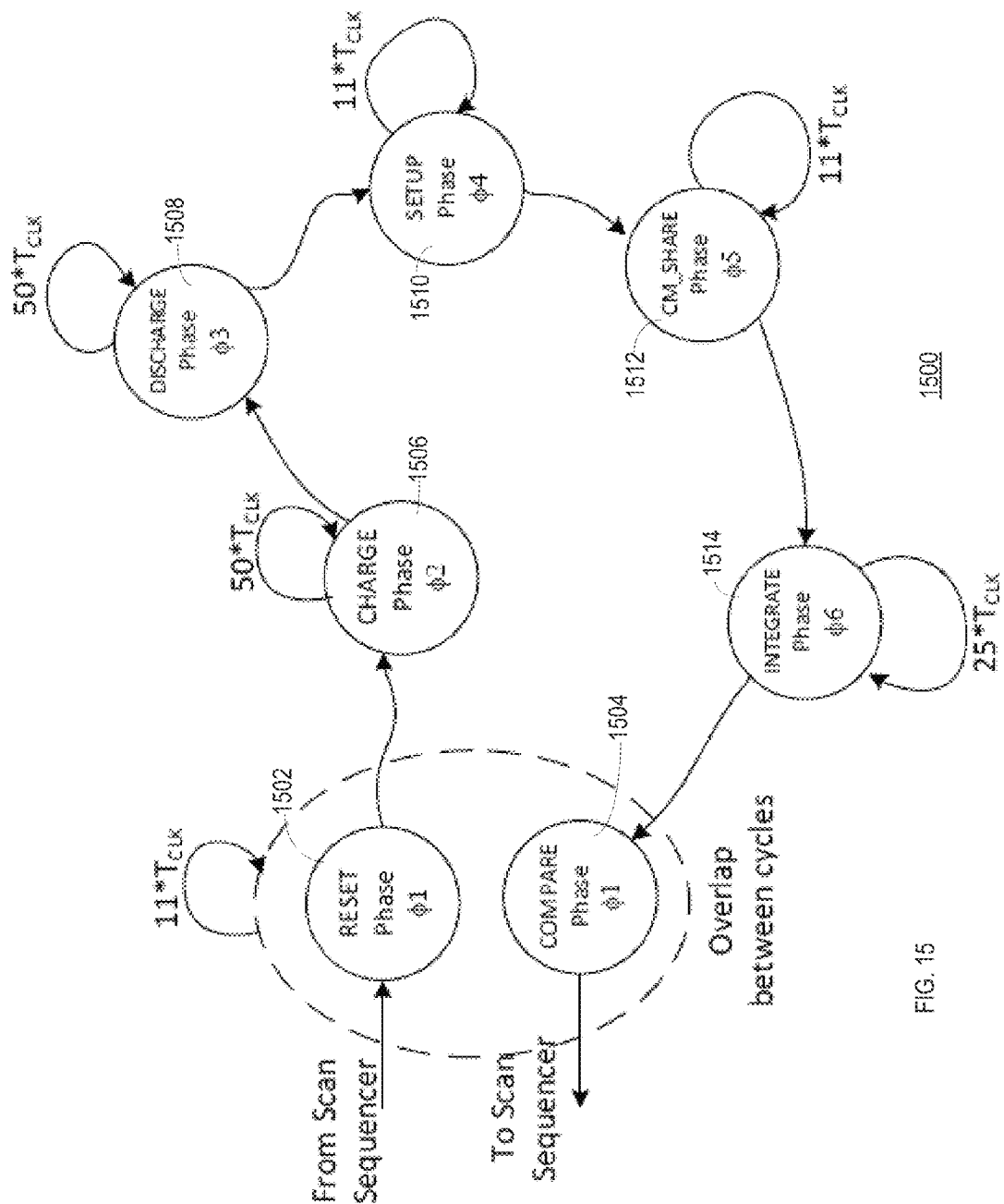
FIG. 15 is a state diagram illustrating a phase sequencer in a Parallel Self-Capacitance Sensing Mode of operation of the capacitive touch sensing system of FIG. 5.

FIG. 15 is a state diagram illustrating a phase sequencer 1500 in a Parallel Self-Capacitance Sensing Mode of operation of the capacitive touch sensing system of FIG. 5. In 1502, a scan sequencer (FIG. 16) initiates the reset phase. This lasts for 11 clock cycles and overlaps in time with the compare phase, state 1504, of the previous cycle. After the reset phase, control proceeds to state 1506 for the charge phase. After 50 clock cycles, control proceeds to the discharge phase, state 1508. After another 50 clock cycles, at state 1510, the setup phase is entered. After 11 clock cycles, control proceeds to state 1512 and the cm_share phase is entered for 11 more clock cycles. Subsequently, at state 1514, the integrate phase is entered for 25 clock cycles, then control proceeds to the state 1504 for the compare phase, lasting 11 clock cycles. Control then returns to the scan sequencer of FIG. 16. The number of clock cycles in each state illustrated here is exemplary only.

Figure 16:
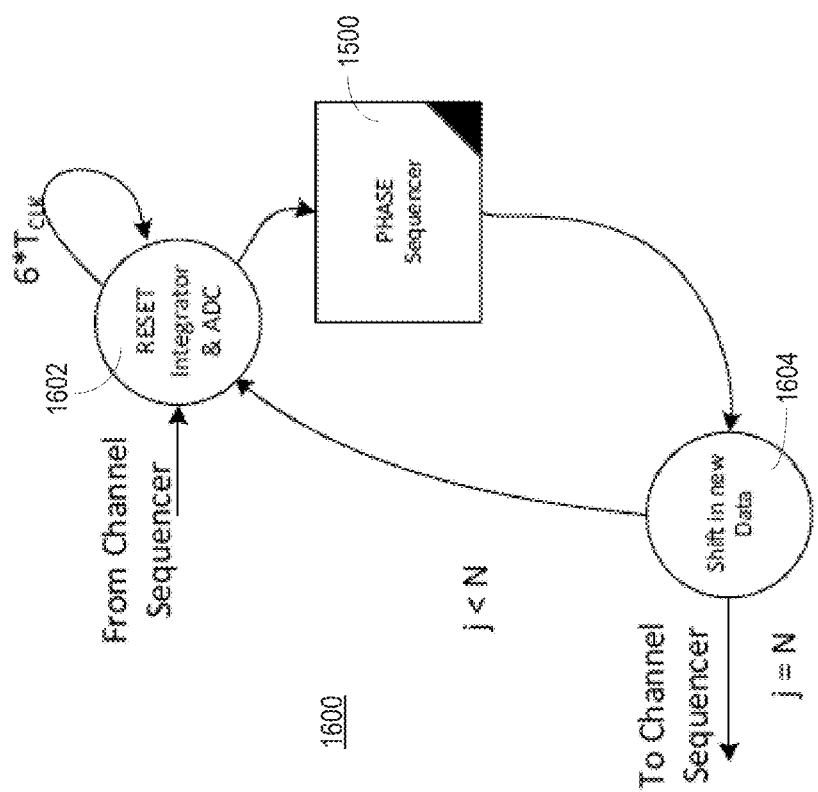
FIG. 16 is a state diagram illustrating a frame sequencer in a Parallel Self-Capacitance Sensing Mode of operation of the capacitive touch sensing system of FIG. 5.

FIG. 16 is a state diagram illustrating a frame sequencer 1600 in a Parallel Self-Capacitance Sensing Mode of operation of the capacitive touch sensing system of FIG. 5. FIG. 16 shows a process which is at one level higher than the phase sequencer illustrated in FIG. 15. This process is called the scan sequencer 1600 and it iterates Phase Sequences and shifts-in analog to digital converter data into digital filters at the end of one complete scan. The scan sequencer 1600 is initiated by a channel sequencer (FIG. 17) which at state 1602 initiates a reset operation. State 1602 in this example is maintained for 6 clock cycles before the phase sequencer 1500, FIG. 15, is called. After the operation of the phase sequencer, control proceeds to state 1604 where the sensed data are stored to memory for further processing. Control then returns to the channel sequencer of FIG. 17).

SSS Mode

In SSS Mode, all the sensors, which are enabled, are sensed one at a time in a sequence. Since the sensors are sensed in a sequence one at a time, in this mode, only one of the AFE circuits 600 is enabled at any one time. However all switch matrix circuits 602 are functional. In this mode, the common mode sensing circuit sensor input is connected to a communication bus through an external switch. Then, during each sensor's active period in the sequence, the sensor's switch matrix is used to connect it to the communication bus. In sequential mode, there is no concept of common mode signal and hence common mode cancellation can't be applied. However, since there is only one sensor enabled, the average is itself and subtracting of such charge will result in a null signal. Hence, during the integrate phase, the average charge $Q_{avg}$ needs to be added rather than subtracted. Therefore during this mode a separate signal called avg_subtract signal is deasserted, so that during the integrate phase, the average charge, which is signal itself, gets added instead of being subtracted.

The phase sequencer (FIG. 15) and the frame sequencer (FIG. 16) for SSS Mode are the same as that in PSS Mode. However after each scan, another loop, one level higher than the frame sequencer, iterates through all the enabled channels one at a time. This is called the channel sequencer.

Figure 17:
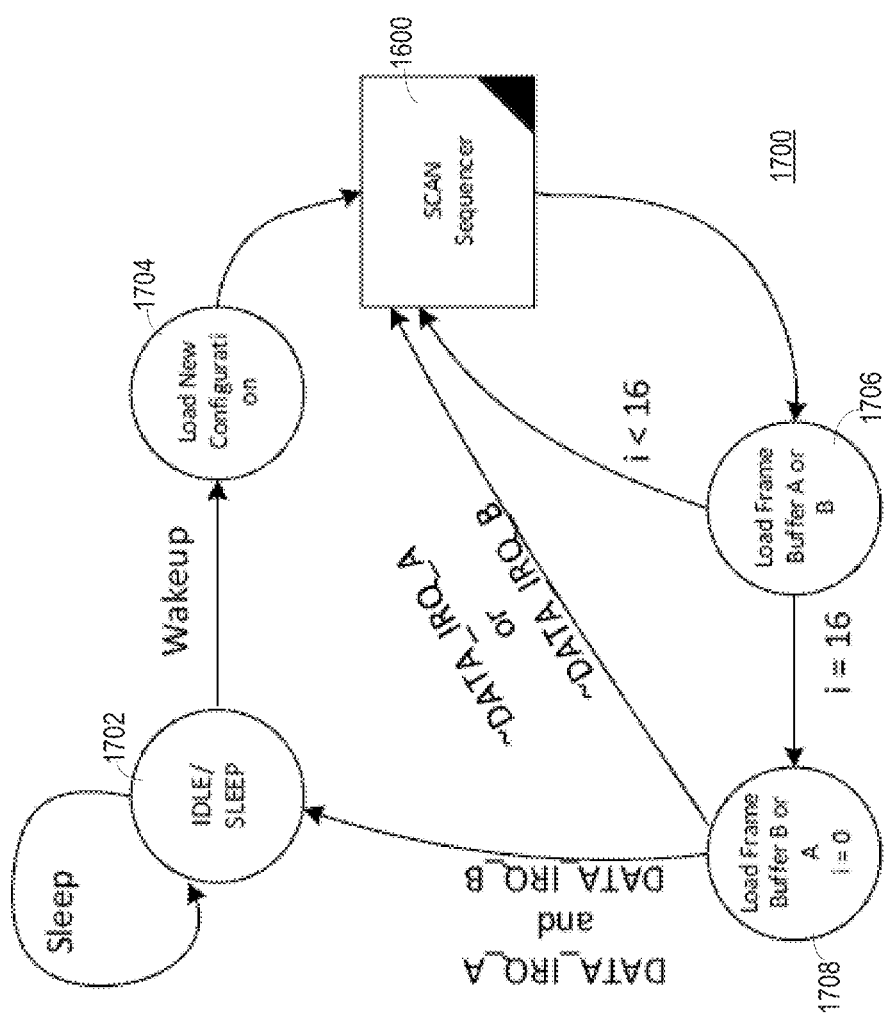
FIG. 17 is a state diagram illustrating a channel sequencer in a Parallel Self-Capacitance Sensing Mode of operation of the capacitive touch sensing system of FIG. 5.

FIG. 17 is a state diagram illustrating a channel sequencer 1700 in a Parallel Self-Capacitance Sensing Mode of operation of the capacitive touch sensing system 500 of FIG. 5. The capacitive touch sensing system 500 remains in a low power sleep mode, state 1702, until a wakeup signal occurs. Control proceeds to state 1704 where new configuration information is loaded. For example, the configuration information may be loaded from the registers 502 to the sensing block 508 (FIG. 5). Control then proceeds to the frame sequencer 1600 (FIG. 16). Upon completion of the frame sequencer 1600, a frame of data is loaded to a frame buffer. This process repeats, in the example, until 16 frames have been loaded, state 1706. Control then proceeds to state 1708. The signals DATA_IRQ_A or DATA_IRQ_B may be asserted indicating data is available. Control then proceeds back to the frame sequencer 1600 to receive more data or to the sleep mode, state 1702, if frames of available data have not yet been read.

CMS Mode

In CMS Mode, the AFE circuit 600 (FIG. 6) senses mutual capacitance between sensor pairs. It is possible to scan one row at a time to sense all the mutual capacitances in the touch panel. However a more efficient solution is to drive orthogonal codes to the rows and compute the mutual capacitance matrix from the sensed capacitances on the columns. This process is described in connection with FIGS. 18 and 19.

Figure 18:
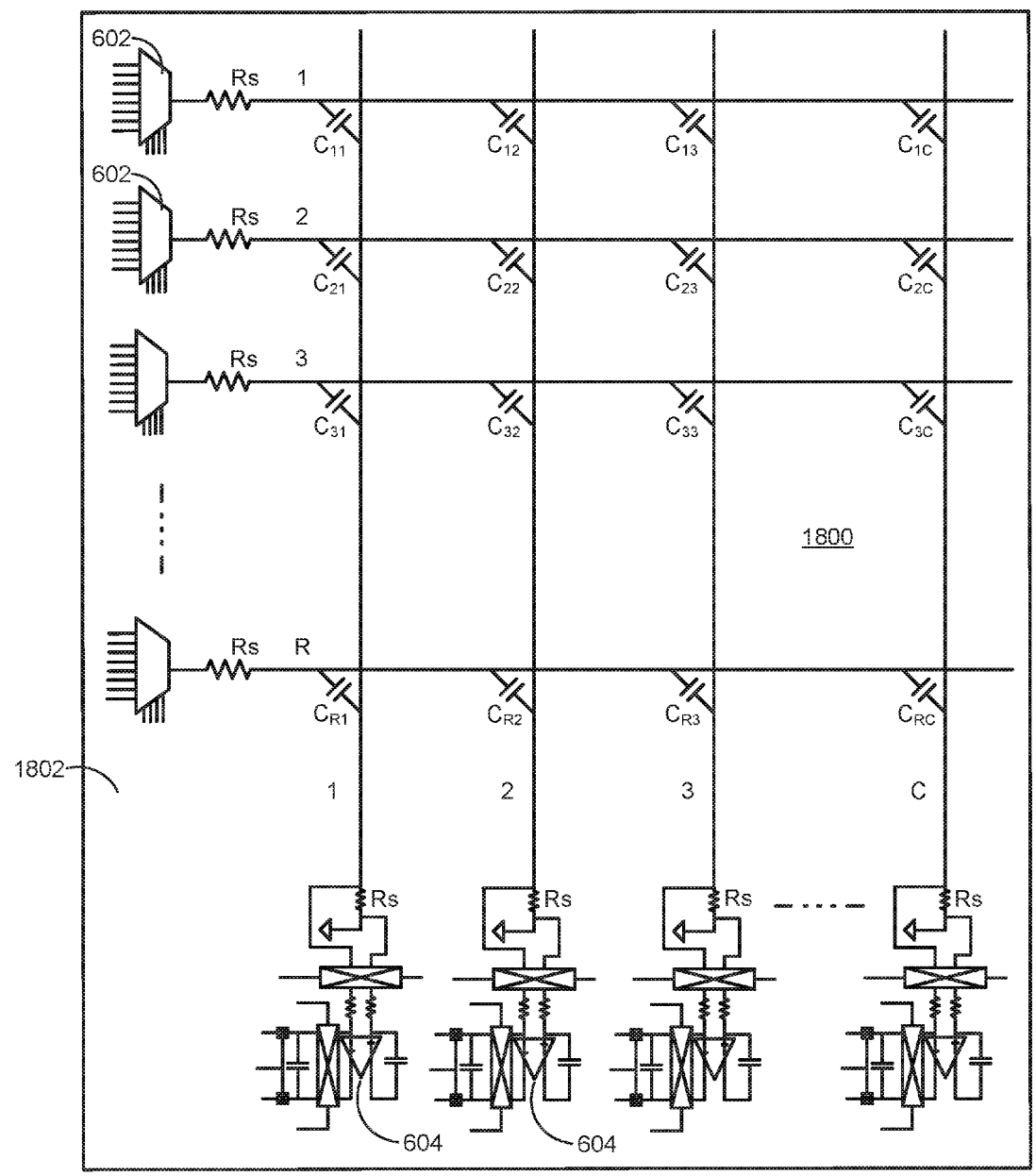
FIG. 18 illustrates a mutual capacitance matrix in a capacitive touch panel.

FIG. 18 illustrates a mutual capacitance matrix 1800 in a capacitive touch panel 1802. The mutual capacitance matrix 1800 is arranged as a number of rows intersecting with a number of columns. The rows form sensors and are driven with signals by switch matrices 602, one switch matrix 602 per row. The columns form sensors of the capacitive touch panel. Each column has an associated analog front end (AFE) circuit including an integrator 604 to detect the state of the sensor of the column.

The mutual capacitance matrix 1800 can be associated with a Hadamard matrix. A Hadamard matrix is a square matrix whose entries are either +1 or −1 and whose rows are orthogonal. For example, a matrix with R number of rows requires an orthogonal code set of length R and hence the code matrix will be $H_{RR}$. The orthogonal codes represented by the matrix entries may be used to compute the mutual capacitance matrix of the mutual capacitance matrix 1800. The orthogonal codes can be used to set the polarity of voltages to be applied to rows of the mutual capacitance matrix 1800. The orthogonal codes, one per row of the Hadamard matrix, can be applied in time sequence to the rows of the mutual capacitance matrix 1800. To send an R×R matrix through sensors requires R time slots so that one row of the R×R matrix is applied to the mutual capacitance matrix 1800 during each time slot. This scheme, called Code Division Multiple Access (CDMA) based touch sensing, provides higher signal to noise ratio (SNR) since all drive lines are excited in each time slot. In this mode, among all the sensors, some are configured for drive only (rows) and some are configured for sense only (columns). Instead of driving and sensing on the same sensor, in CMS mode, the row sensors are driven together with the orthogonal code while all column sensors are sensed together as in PSS mode.

In CMS mode, the sequencer starts by loading new configuration data which includes the polarity of voltages to be applied in various phases. Assume R number of sensors are configured to be driven and C number of sensors are configured to be sensed such that R+C≤S, where S is total number of channels. The sensor matrix will have R×C number of mutual capacitance nodes as indicated in FIG. 18. Further, assume we want to use a Hadamard code to drive the sensors. FIG. 19 shows a Hadamard matrix 1900 for R=8. While R is set to 8 in this example, any number of rows and columns may be specified.

In this case, during a first time slot, all sensors need to be driven with positive polarity, as indicated by the top-most row of the Hadamard matrix 1900. Hence, the host will configure the switch matrix 602 for corresponding channels to be positive during the charge phase and negative during the discharge phase. Also since the signal will be R times larger, the host configures gain for all C sense channels to be 1/R to avoid saturating the integrator 604 for each column. The sequencer sequences through N cycles and subsequently acquire analog to digital converter data to get one result per sense channel which will be stored in the frame buffer. The sequencer then signals the host for data availability through IRQ.

Subsequently, the host configures the registers for a second time slot such that drive polarity of various drive channels are according to a code. Hadamard matrix 1900 illustrates an example code, which is alternating polarity. Other codes may be used as well. During this time slot and in subsequent time slots, the net signal in absence of finger, stylus or other object touching the surface of the touch panel, is zero and hence all the sense channels are configured for higher (unity) gain. The drive channels with negative polarity will be configured to have negative voltage during the charge phase and positive voltage during the discharge phase.

After going through all R time slots, the host will have R×R capacitance data points with enough information to decode the actual capacitance matrix. If the capacitance matrix is represented by a matrix $C_{RC}$, the sensed capacitance is:

$$S_{RC} = H_{RR} C_{RC}$$

The $S_{RC}$ matrix represents a coded capacitance matrix. If $H_{RR}$ has properties of being orthogonal code, as is the case with a Hadamard matrix, then its inverse can be found and hence $C_{RC}$ can be reconstructed as:

$$\frac{1}{R} H_{RR}^T S_{RC} = \frac{1}{M} H_{RR}^T H_{RR} C_{RC} = \frac{1}{M} M I C_{RC} = C_{RC}$$

It can be shown that such matrix is always invertible and matrix inversion can be done without complex matrix manipulations and by simply using the transpose of the matrix and dividing by the order of the matrix.

The deconvolution of the capacitance matrix may be computed in the host processor and the host processor is also responsible for setting up the switch matrix 602 for each channel during each timeslot. The phase sequencer and frame sequencer are same as that in PSS mode.

One of the major benefits of this scheme is that after one CDMA frame (R time slots), the system has sensed (excited) each sensor node R times and the resulting signal computed will have the effect of averaging R samples per sensor node. Assuming uncorrelated noise, this will result in 1/R reduction in variance of the noise and hence improve SNR by $\sqrt{R}$.

From the foregoing, it can be seen that the present embodiments provide system and method for a capacitive touch sensing system in a capacitive touch panel. The system and method enable reducing chip area by dynamically reconfiguring analog circuitry during several time-sequenced phases. Each analog front end circuit requires just a single operational amplifier and other resistors and capacitors. But the operational amplifier is reconfigured between operations of sensing capacitance on a sensor of the touch panel during initial phases and operating as a sigma-delta analog to digital converter during subsequent phases. A sensing sequencer state machine enables operation of the capacitive touch sensing system in a variety of operational modes.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

Various implementations have been specifically described. However, many other implementations are also possible.

The invention claimed is:

1. A method comprising:
   charging respective sensor capacitors of a plurality of sensor capacitors of a capacitive touch panel and sensing respective charging currents using respective sense resistors;
   integrating the respective charging currents in respective integrator circuits to produce respective signal charge;
   discharging the respective sensor capacitors and sensing respective discharging currents using the respective sense resistors;

inverting the respective discharging currents and integrating the respective inverted discharging currents in the respective integrator circuits to produce respective signal charge;

adding result of the integration of the respective inverted discharging currents to result of the integration of the respective charging currents to produce a signal charge;

splitting the signal charge onto two half signal charges stored on two capacitors;

finding an average signal charge among all sensor capacitors of the plurality of sensor capacitors by sharing one capacitor of the two capacitors storing half of the signal charge; and subtracting the average signal charge from each respective half signal charge stored on the other capacitor to produce a resulting charge.

2. The method is claim 1 further comprising:
quantizing the resulting charge to produce digital data representative of deviation from mean of respective current capacitance values of the respective sensor capacitors of the plurality of sensor capacitors.

3. The method of claim 2 further comprising:
during a charge phase and a discharge phase, configuring the respective integrator circuits as continuous time integrators;
integrating together the respective charging currents and the respective discharging currents in respective continuous time integrators;
during a subsequent integrate phase, reconfiguring the respective integrator circuits as switched capacitor integrators;
computing deviation from mean of each respective signal charge; and
performing sigma delta analog to digital conversion using the reconfigured switched capacitor integrators, a comparator and digital up-down counter.

4. The method of claim 3 wherein reconfiguring the respective integrator circuits as switched capacitor circuits comprises removing continuous time integrator components from the respective continuous time integrators including an operational amplifier circuit and substituting switched capacitor integrator components with the operational amplifier circuit in the switched capacitor circuits to reuse the operational amplifier circuit.

5. The method of claim 2 wherein quantizing the resulting charge comprises:
producing a positive result or a negative result based on sign of the integration result;
combining the positive result or the negative result with previous results in a digital counter; and
feeding back the positive result or the negative result to control integration of an error charge with the average signal charge, the respective previously stored integration result and the respective current signal charge.

6. The method of claim 2 further comprising:
sharing one-half of current signal charge among all respective sensor capacitors of the plurality of sensor capacitors; and
removing the one-half of the current signal charge as a common mode signal across all respective sensor capacitors of the plurality of sensor capacitors.

7. The method of claim 2 wherein quantizing the integration result comprises:
incrementing or decrementing a counter circuit based on mathematical sign of the integration result.

8. The method of claim 7 wherein quantizing the integration result further comprises:

feeding a signal back to provide the mathematical sign of the integration result for a next cycle of operation.

9. A capacitive touch sensing system comprising:
a plurality of sensors arranged in a capacitive touch panel;
a plurality of analog front end circuits, each respective analog front end circuit configured to be coupled with a respective sensor of the plurality of sensors, each respective analog front end circuit comprising:
an operational amplifier circuit configurable in a charging phase and a discharging phase as a continuous time integrator to integrate charge from a respective sensor onto one or more capacitors and reconfigurable in an integrate phase to integrate charge from a plurality of capacitors including the one or more capacitors; and
a comparator configured to be coupled with the operational amplifier circuit in the integrate phase to produce digital data indicative of integrated charge in the integration phase; and
wherein each respective analog front end circuit further comprises a polarity switch coupled between the respective sensor and inputs of the operational amplifier circuit, the polarity switch reconfigurable between the charging phase and the discharging phase to combine charge from the respective sensor during the discharging phase with charge from the respective sensor during the charging phase.

10. The capacitive touch sensing system of claim 9 further comprising:
a plurality of switch matrix circuits, respective switch matrix circuits of the plurality of switch matrix circuits configured to be coupled to respective sensors of the plurality of sensors and to respective analog front end circuits of the plurality of analog front end circuits.

11. The capacitive touch sensing system of claim 9 wherein the each respective analog front end circuit further comprises:
a counter circuit configured to be coupled to the comparator to count the digital data indicative of integrated charge and produce a multiple bit result indicative of a capacitance of a respective sensor to which the respective analog front end circuit is coupled.

12. The capacitive touch sensing system of claim 9 wherein the operational amplifier circuit is reconfigurable in the integrate phase as a switched capacitor integrator.

13. The capacitive touch sensing system of claim 12 wherein the operational amplifier in the integrate phase is operative during a current cycle of operation to integrate a current signal charge (C2), an average charge (C3), a stored charge (C1, C4) from a previous cycle and a charge (C5) indicating a sign of digital data produced during a previous cycle of operation.

14. A capacitive touch sensing system comprising:
a plurality of sensors arranged in a capacitive touch panel;
a plurality of analog front end circuits, each respective analog front end circuit configured to be coupled with a respective sensor of the plurality of sensors, each respective analog front end circuit comprising:
an operational amplifier circuit configurable in a charging phase and a discharging phase as a continuous time integrator to integrate charge from a respective sensor onto one or more capacitors and reconfigurable in an integrate phase to integrate charge from a plurality of capacitors including the one or more capacitors;

a comparator configured to be coupled with the operational amplifier circuit in the integrate phase to produce digital data indicative of integrated charge in the integration phase;

a sensing sequencer operative to select an operating mode of the capacitive touch sensing system as one of a parallel self-capacitance sensing mode, a sequential self-capacitance sensing mode and a coded mutual-capacitance sensing mode; and registers including memory configured to store configuration data, the configuration data responsive to operating mode selected by the sensing sequencer to provide to each analog front end circuit configuration data to control configuration of the each analog front end circuit.

15. The capacitive touch sensing system of claim 14 wherein the sensing sequencer is operative in the coded mutual-capacitance sensing mode to provide data defining orthogonal codes to rows of the capacitive touch panel for determination of a mutual capacitance matrix of the rows and columns of the capacitive touch panel.

16. A method comprising:

integrating in an operational amplifier, configured as a continuous time integrator circuit, charge from one sensor of a plurality of sensors of a capacitive touch sensor;

integrating, in the operational amplifier, configured as a switched capacitance integrator, charge from a current signal (C2) from the sensor and charge from a previous integration cycle (C1, C4); and integrating, in the operational amplifier configured as a switched capacitance integrator, charge of an average signal value (C3) across all sensors of the plurality of sensors and charge indicative of mathematical sign of a result of the previous integration cycle (C5) with the charge from the current signal from the sensor (C2) and the charge from the previous integration cycle (C1, C4).

17. The method of claim 16 further comprising:

comparing differential output signals of the operational amplifier configured as a switched capacitance integrator to determine mathematical sign of a result of the current integration cycle.

18. The method of claim 17 further comprising:

quantizing a result of integrating the charge of an average signal value (C3), the charge indicative of mathematical sign of a result of the previous integration cycle (C5), the charge from the current signal from the sensor (C2) and the charge from the previous integration cycle (C1, C4) to produce digital data; and counting the digital data over a plurality of integration cycles to estimate capacitance of the one sensor.

* * * * *